United States Patent
Ferrandis et al.

(10) Patent No.: US 6,480,146 B1
(45) Date of Patent: Nov. 12, 2002

(54) INTERMITTENT USE OF A PORT IN RESPONSE TO LOCATION DATA PUSH

(75) Inventors: Ludovic Ferrandis, Montpellier; Olivier Guiter, Mireval; Paul Plaquette, Montpellier, all of (FR)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/998,541

(22) Filed: Nov. 29, 2001

(51) Int. Cl.[7] .............................. G01S 5/02; H04B 7/185
(52) U.S. Cl. .................................... 342/357.06; 701/213
(58) Field of Search ...................... 342/357.06, 357.1, 342/357.09; 701/213

(56) References Cited

U.S. PATENT DOCUMENTS

| | | | |
|---|---|---|---|
| 5,606,732 A | * 2/1997 | Vignone, Sr. | ................ 455/269 |
| 5,914,675 A | * 6/1999 | Tognazzini | ................. 340/989 |
| 6,011,473 A | * 1/2000 | Klein | ......................... 340/571 |

* cited by examiner

*Primary Examiner*—Theodore M. Blum
(74) *Attorney, Agent, or Firm*—Wagner Murabito & Hao LLP

(57) ABSTRACT

A method and apparatus for receiving data via the intermittent use of a port. One embodiment of the preset invention may first access a signal from a location determining device. Responsive to the signal, a communication port may be automatically activated by system resources. Location information may then be received via the communication port and stored into memory in a format that can be unique to the location determining device. Responsive to the reception of the information, the communication port may be automatically deactivated. Optionally, the data or location information can be translated into a general format readable by all applications that recognize the universal data format, e.g., XML. Application programs that have registered or requested location information may be notified of the receipt of location information.

31 Claims, 3 Drawing Sheets

INTERMITTENT USE OF A PORT IN RESPONSE TO LOCATION DATA PUSH

FIELD OF THE INVENTION

Embodiments of the present invention relate to hand held computer systems. More particularly, embodiments of the present invention provide a method and apparatus for controlling a communication port in response to receiving location information.

BACKGROUND ART

Communication ports on hand held computer systems, particularly when configured for driving signal lines over distances greater than approximately five centimeters, are relatively high power devices within a battery powered hand held computer system. For example, well known driver electronics to convert from CMOS logic levels to RS-232 voltage levels can consume as much power as the main processor in the hand held system. Because of the limited amount of power in the system's battery, it is therefore important to keep the communication port inactive, in a low power state, whenever possible.

Unfortunately, in prior art methods and systems, an application needing location information (e.g., a moving map display) would turn on a communication port and establish a communications dialog with the location determining device, e.g., a Global Positioning System device. The application would typically poll the device for updated information. This process would continue, and the communication port would unfortunately remain open in its highest power mode, for the duration of the application's session. This results in an unnecessary power drain, and shortens the battery life of such a hand held computer.

Further, while the application was communicating across the communication port, the communication port was unavailable to other applications that may have also needed to communicate across the communication port. For example, if a travel guide application was also available on the system, it would be unable to access the communication port, and consequently would be unable to access the location information required for its operation. Such limitations restricted the effectiveness of prior art hand held computer systems.

In addition, it was generally necessary for application programs to be constructed specifically for a particular location determining device, because each GPS device vendor typically has a unique communications format. For example, software vendor "A" was required to make application program version "A1" to work with GPS device "B," and application program version "A2" to work with GPS device "C." This is a result of the prior art implementation of the application program communicating directly with the location determining device. Creating and managing such software variations for GPS units from many suppliers is a heavy burden for software vendors. Unfortunately, it is also problematic for users of the hand held device, as they must be aware of interoperability requirements. A major goal of usability is to shield the user from such technical concerns.

Consequently, improvements in the management of a communication port offer improvements in battery life and effectiveness of hand held computer systems, and are highly desired by manufacturers and users alike.

SUMMARY OF THE INVENTION

Therefore, it would be advantageous to provide a method and apparatus to provide for intermittent use of a port in response to location information pushed by a location determining device. A further need exists for a method of sharing a communication port. A still further need exists for a method of distributing location information among several applications. A need further exists for providing information to applications of a hand held computer system in a general or universal format understood by all applications.

Embodiments of the present invention provide a method and system for intermittent use of a port in response to location information pushed by a location determining device. Embodiments of the present invention provide a method and system that allow for sharing a communication port. Embodiments of the present invention provide a method and system for distributing location information among several applications. Embodiments also employ a universal data format for distributing location data to applications, thereby obviating the need for the applications to be aware of any unique or specific GPS interface.

A method and apparatus for receiving data via the intermittent use of a port is disclosed. One embodiment of the preset invention may first access a signal from a location determining device. Responsive to the signal, a communication port may be automatically activated. Location information may then be received via the communication port. Responsive to the reception of the information, the communication port may be automatically deactivated. Application programs that have registered or requested location information may be notified of the receipt of location information.

Another embodiment of the present invention provides for the location information to be generated by a Global Positioning System.

In one embodiment of the present invention, the communication port is substantially compliant with RS-232.

In another embodiment of the present invention, the communication port is substantially compliant with a Secure Digital card interface.

In yet another embodiment of the present invention, information may be received via a communication port in a format unique to the location determining device. The information may be determined to originate from a Global Positioning System device. Responsive to such a determination, the information may be translated into a universal data format recognizable to several applications. The several applications may be notified that GPS information is available.

In still another embodiment of the present invention, location information may be received from a mobile telephony device.

DETAILED DESCRIPTION OF THE INVENTION

Figure 1:
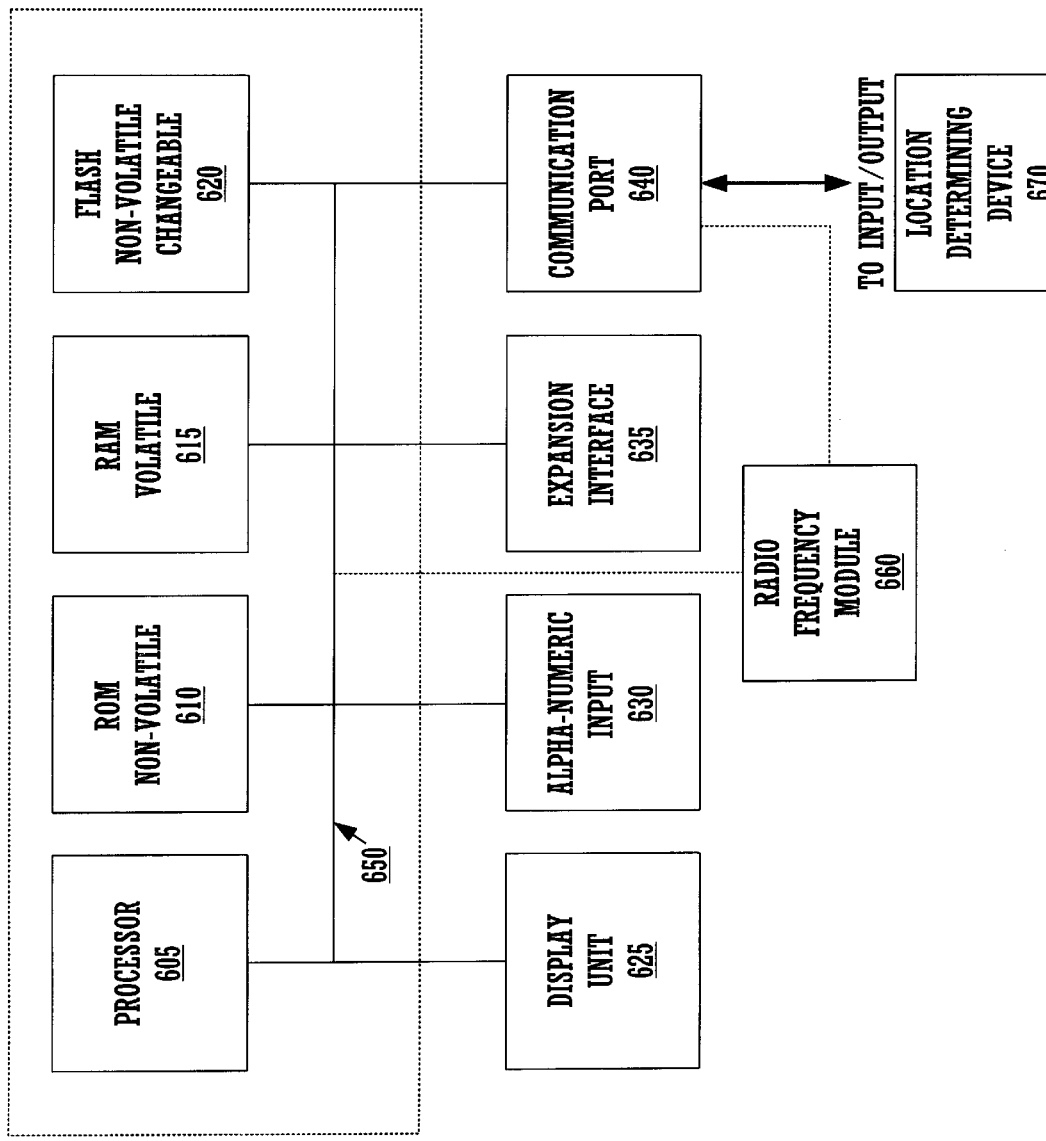
FIG. 1 is a block diagram of a computer system, which may be used as a platform to implement embodiments of the present invention.

In the following detailed description of the present invention, intermittent use of a port in response to location data push, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., process 200) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Intermittent use of a Port in Response to Location Data Push

The present invention is described in the context of a hand held computer system. However, it is appreciated that the present invention may be utilized in other types of portable electronic devices where it desirable for many applications to receive location information in a power efficient manner. Location information may originate from a Global Positioning System (GPS).

FIG. 1 is a block diagram of a computer system, which may be used as a platform to implement embodiments of the present invention. Computer system 100 includes an address/data bus 650 for communicating information, a central processor 605 functionally coupled with the bus for processing information and instructions, a volatile memory 615 (e.g., random access memory RAM) coupled with the bus 650 for storing information and instructions for the central processor 605 and a non-volatile memory 610 (e.g., read only memory ROM) coupled with the bus 650 for storing static information and instructions for the processor 605. Computer system 100 also optionally includes a changeable, non-volatile memory 620 (e.g., flash) for storing information and instructions for the central processor 605 which can be updated after the manufacture of system 100.

Computer system 100 also optionally includes an expansion interface 635 coupled with the bus 650. Expansion interface 635 can implement many well known standard expansion interfaces, including without limitation the Secure Digital card interface, universal serial bus (USB) interface, Compact Flash, Personal Computer (PC) Card interface, CardBus, Peripheral Component Interconnect (PCI) interface, mini-PCI interface, IEEE 1394, Small Computer System Interface (SCSI), Personal Computer Memory Card International Association (PCMCIA) interface, Industry Standard Architecture (ISA) interface, or RS-232 interface. It is appreciated that external interface 635 may also implement other well known or proprietary interfaces, such as Memory Stick interface, commercially available from Sony Corporation, or Springboard interface, commercially available from Handspring, Inc.

In one embodiment of the present invention, expansion interface 635 may consist of signals substantially compliant with the signals of bus 650.

A wide variety of well known expansion devices may be attached to computer system 100 via expansion interface 635. Examples of such devices include without limitation rotating magnetic memory devices, flash memory devices, digital cameras, wireless communication modules, digital audio players and Global Positioning System (GPS) devices.

System 100 also optionally includes a communication port 640. Communication port 640 may be implemented as part of expansion interface 635. When implemented as a separate interface, communication port 640 may typically be used to exchange information with other devices via communication-oriented data transfer protocols. Examples of communication ports include without limitation RS-232 ports, universal asynchronous receiver transmitters (UARTs), USB ports, infrared light transceivers, ethernet ports, IEEE 1394 and synchronous ports.

In general, expansion interface 635 has more signal lines and operates at higher data rates than communication port 640. Conversely, communication port 640 generally is able to communicate over greater distances than expansion interface 635. It is appreciated, however, that that there can be a great deal of overlap in the type of interface and functions assigned to expansion interface 635 and communication port 640, in accordance with embodiments of the present invention.

Communication ports, particularly communication port 640 when configured for driving signal lines over distances greater than approximately five centimeters, are relatively high power devices within system 100. For example, well known driver electronics to convert from CMOS logic levels to RS-232 voltage levels can consume as much power as processor 605. Therefore, it is important to keep communication port 640 inactive, in a low power state, as much as possible.

In a preferred embodiment, external expansion for system 100, whether expansion interface 635 or communication port 640, includes an electrical contact for an interrupt signal that may be used to wake up the system. This interrupt signal allows an external device to initiate communication, allowing system 100 to go into a low power mode while waiting for activity. This signal is well known on many standard expansion interfaces, and is a well known addition to interfaces based on many communication ports.

System 100 optionally includes a radio frequency module 660, which may Implement a mobile telephone, a pager, or a digital data link. Radio frequency module 660 may be interfaced directly to bus 650, via communication port 640 or via expansion interface 635.

Of particular interest, it is well known that some mobile telephone modules or digital data links can provide location information based on interaction with the wireless network in an embodiment of the present invention. Such location information may be determined independent of a Global Positioning System, or in conjunction with a Global Positioning System. One technique, independent of a GPS system, is to triangulate position based on the received signal strength of all heard base stations. Another approach is for the wireless network to provide the location of the base station currently in communication with the mobile unit. It is appreciated that any technique of determining location or location information is well suited to embodiments of the present invention.

Still referring to FIG. 1, system 100 may optionally include or be in communication with a location determining device 670. As discussed above, such a device may be a part of a radio frequency module. Location determining device 670 may also be a dedicated device, such as a Global Positioning System device. Location determining device 670 may be an integral part of system 100, or it may be interfaced to system 100 via communication port 640 or expansion interface 635.

Also included in computer system 100 of FIG. 1 is an optional alphanumeric input device 630. Device 630 can communicate information and command selections to the central processor 600. Device 630 may take the form of a touch sensitive digitizer panel.

The optional display unit 625 utilized with the computer system 100 may be a liquid crystal display (LCD) device, cathode ray tube (CRT), field emission device (FED, also called flat panel CRT), light emitting diode (LED), plasma display device, electro-luminescent display, electronic paper or other display device suitable for creating graphic images and alphanumeric characters recognizable to the user.

Figure 2:
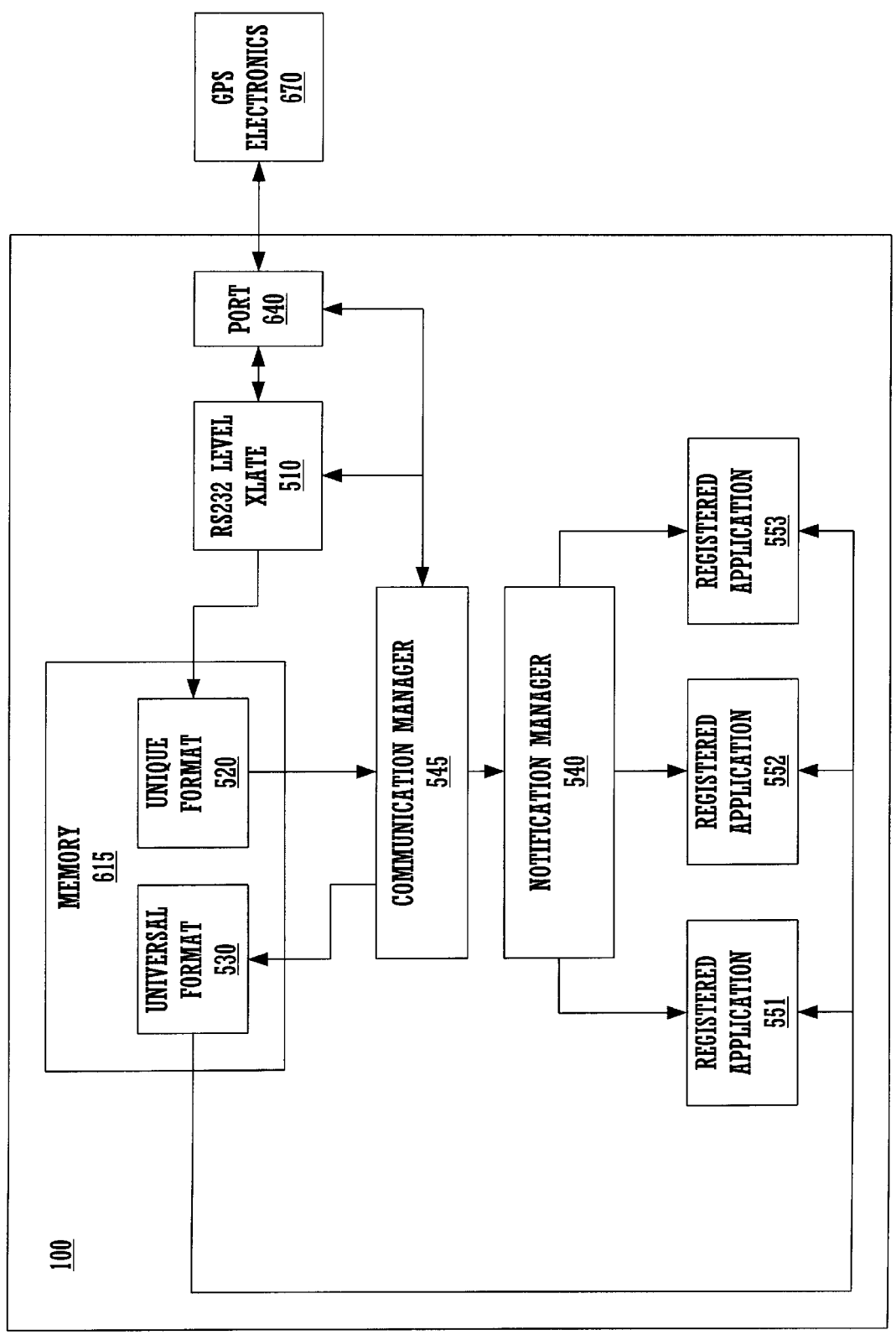
FIG. 2 is a data flow diagram illustrating a data flow among both software and hardware elements of a hand held computer system, according to an embodiment of the present invention.

FIG. 2 is a data flow diagram illustrating a data flow among both software and hardware elements of hand held computer system 100, according to an embodiment of the present invention.

GPS electronics 670 may be internal or external to hand held computer system 100. Herein, they are depicted externally. When GPS electronics 670 determines that it is ready to send or "push" information to system 100, GPS electronics 670 may activate an interrupt signal that wakes up system 100.

Responsive to this signal, communication manager software 545 turns on communication port 640 and RS-232 level translator 510. RS-232 level translator 510 changes the voltage and current levels of RS-232 into levels that may be used by other electronics within system 100. Communication manager software 545 may be a part of the operating system for system 100.

Communication manager software 545 may detect that the information stream from GPS electronics 670 is, in fact, GPS information, and may store the GPS information into memory location 520 of memory 615.

The GPS information stored in memory location 520 is typically provided by GPS electronics 670 in a format that is unique to GPS electronics 670.

Communication manager software 545 may read the GPS information from memory location 520, and may translate it into a universal format and may store it into memory location 530. It is appreciated that many well known formats, for example extensible Markup Language (XML), are well suited to embodiments of the present invention.

Communication manager software 545 may signal notification manager 540 of the receipt of GPS information. Communication manager software 545 may also turn port 640 and RS-232 level translator 510 off, in order to maximize power savings.

Notification manager 540 may be a part of the operating system of computer system 100. Notification manager 540 may notify a plurality of registered applications (exemplified by registered applications 551, 552 and 553) that GPS information is available. The registered applications (551–553) may then retrieve the GPS information in a universal format from memory location 530.

It is noteworthy that registered applications (551–553) do not control port 640 or RS-232 level translator 510, nor do they communicate directly with GPS electronics 670 as would have been necessary in the prior art. Further, registered applications (551–553) are unaware of the details of the unique format used for information from GPS 670, as required by the prior art. Consequently, the registered applications (551–553) are more universal, more useful and have broader application in the marketplace, while system 100 enjoys improved power management and battery life as results of embodiments of the present invention.

Figure 3:
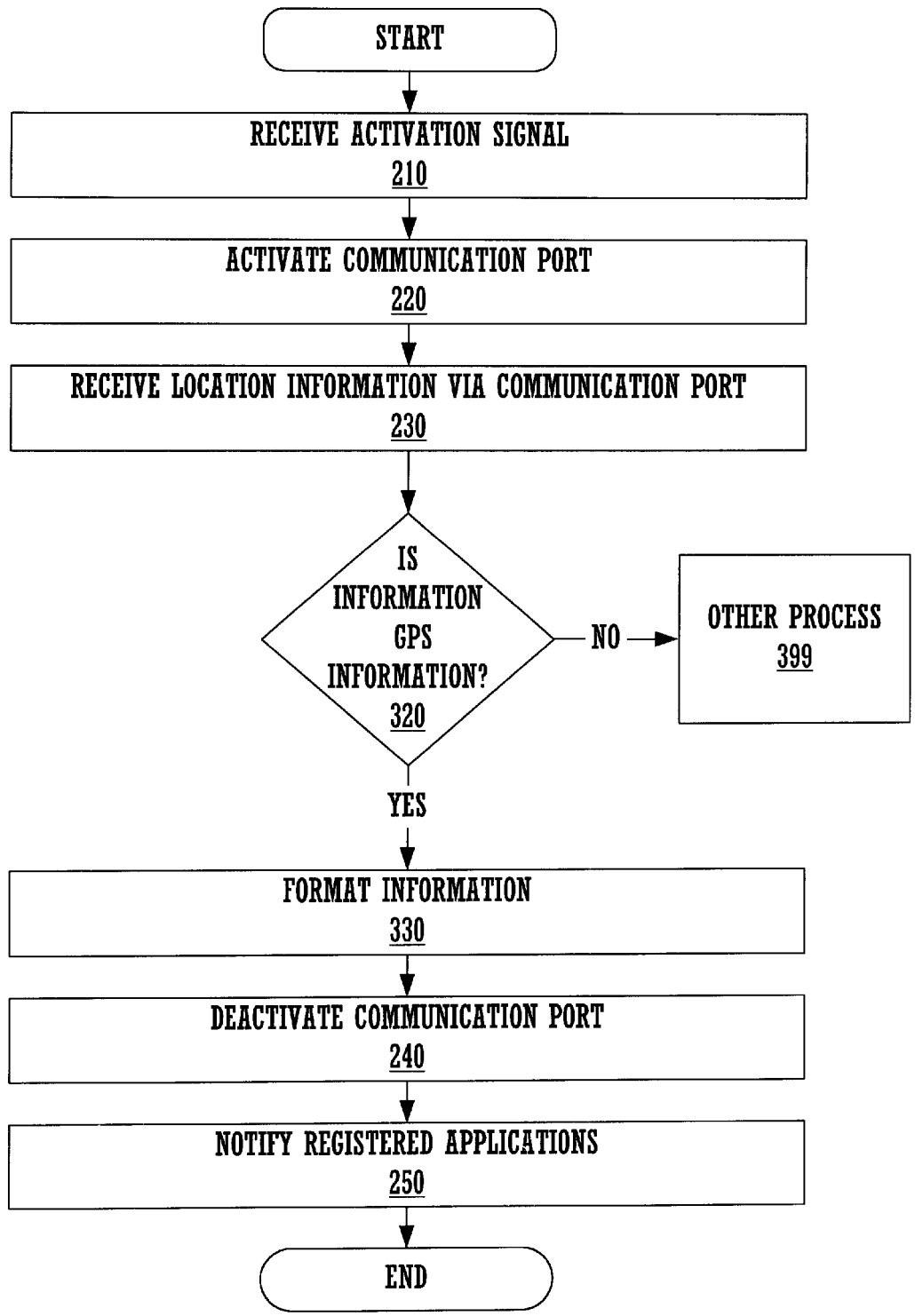
FIG. 3 is a flow diagram illustrating steps of a process 200 for receiving data pushed by a location determining device, in accordance with an embodiment of the present invention.

FIG. 3 is a flow diagram illustrating steps of a process 200 for receiving data pushed by a location determining device, in accordance with an embodiment of the present invention.

In step 210, an activation signal may be received. Such an activation signal may be an interrupt signal, as described above, capable of waking up a system, for example system 100. It is appreciated that other well known methods of waking up a system, such as the "ring detect" interrupt signal generated by many universal asynchronous receiver transmitters (UARTS) in response to a communications signal, are well suited to embodiments of the present invention.

In step 220, a communication port (e.g., expansion interface 635 or communication port 640) may be automatically activated, for example, in response to the activation signal of step 210.

In step 230, a communications dialog may be established with location determining device 670 via a communication port (again, either expansion interface 635 or communication port 640). During Step 230, information is communicated to the computer system 100 via the activated port and may be stored in memory 615. This information may be location information. Location information may be in a format that is unique to the location determining device, and may be stored in memory location 520.

In optional step 320, the location information may be inspected to determine if it contains Global Positioning System information. In a preferred embodiment, GPS information will contain a unique data pattern or "header," which identifies the information as GPS information. It is appreciated that other well known methods of identifying information are also well suited to embodiments of the present invention. An example of an alternative method is to time slice the communications, sending only GPS information during a particular time period.

If step 320 determines that the information is not GPS information, process flow may be transferred to step 399, and other processes may operate on the received information.

However, if step 320 determines that the information is GPS information, process flow may continue to step optional step 330.

In step 330, if taken, the GPS information stored in memory location 520 may be formatted into a universal data format recognizable to a plurality of registered applications, e.g., XML, and stored in memory location 530. Communication manager 545 may perform this optional formatting.

In step 240 the communication port 640 and RS-232 level translator 510 may be automatically deactivated in order to maximize power savings.

In step 250, all applications that have registered to be notified upon the receipt of location information (e.g., registered applications 551–553) may be notified of the receipt of the location information. A notification manager 540 that may be part of the computer system's operating system may perform this step.

The lack of interaction between applications and the communication port is noteworthy. In prior art methods, an application needing location information (e.g., a moving map display) would open the communication port and establish a communications dialog with the location determining device. The application would typically poll the device for updated information. This process would continue, and the communication port would remain open in its highest power mode, for the duration of the application's session. That is, the communication port would be active at least as long as the map was displayed. Thus, in prior art methods, power is consumed while the application is active even when the port is not actually in use for transferring information.

Further, in prior art methods, only one application could use the communication port and receive location information at a time. If, for example, a travel guide application was also available on the system, it would be unable to access the location information required for its operation because the moving map display application was "hogging" the port.

In contrast, process 200 allows the location determining device to initiate a data transfer only when there is updated information available. Further, process 200, rather than the individual application, automatically controls the activity of the communication port, maximizing power savings. Finally, process 200 can notify a plurality of applications of the availability of updated location information, avoiding conflicts between many applications attempting to share a single location determining device across a single communication port.

Further, by communication manager 545 translating the GPS information from a device-unique format into a universal format, registered applications (551–553) are unaware of the details of the device-unique format used for information from GPS 670, as required by the prior art. Consequently, the registered applications (551–553) are more universal, more useful and have broader application in the marketplace, while system 100 enjoys improved power management and battery life as results of embodiments of the present invention.

The preferred embodiment of the present invention, a system and method for intermittent use of a port in response to location data push, is thus described. While the present invention has been described in particular embodiments, it should be appreciated that the present Invention should not be construed as limited by such embodiments, but rather construed according to the below claims.

What is claimed is:

1. A method for receiving data comprising:
  a) receiving a signal to automatically activate a communication port;
  b) activating said communication port in response to said signal;
  c) receiving location information via said communication port;
  d) responsive to c), automatically deactivating said communication port; and
  e) notifying registered applications that said location information is present.

2. The method of claim 1 wherein said location information is generated by Global Positioning System electronics.

3. The method of claim 1 wherein said communication port is substantially compliant with RS-232.

4. The method of claim 1 wherein said method is implemented on a hand held computer system and wherein said signal is an interrupt signal accessed on an external contact of said hand held computer system.

5. The method of claim 1 wherein said communication port is substantially compliant with a Secure Digital card interface.

6. The method of claim 1 wherein said communication port is an infrared light transceiver.

7. The method of claim 1 wherein a)–d) are performed transparently to said registered applications.

8. The method of claim 1 wherein a) and d) are performed transparently to said registered applications.

9. In a hand held computer system, a method for receiving data comprising:
  a) receiving information via a communication port of said hand held computer system;
  b) determining that said information originates from a Global Positioning System device, said information formatted in a format unique to said Global Positioning System device;
  c) responsive to b), formatting said information into a universal data format recognizable to a plurality of registered applications; and
  d) responsive to b), notifying said registered applications that said information from said Global Positioning System device is present.

10. The method of claim 9 wherein said communication port is substantially compliant with RS-232.

11. The method of claim 9 wherein said communication port is substantially compliant with a Secure Digital card interface.

12. The method of claim 9 wherein said communication port is an infrared light transceiver.

13. The method of claim 9 wherein b) comprises:
  b1) monitoring information accessed via said communication port for a Global Positioning System header, said location header indicative of Global Positioning System information.

14. In a hand held computer system, a method for receiving data comprising:
  a) receiving a signal to automatically activate a communication port;
  b) activating said communication port in response to said signal;
  c) receiving location information via said communication port, said location information formatted in a format unique to a Global Positioning System device;
  d) responsive to c), automatically deactivating said communication port;

e) determining that said location information originates from said Global Positioning System device;

f) responsive to e), formatting said location information into a universal data format recognizable to a plurality or registered applications; and g) responsive to e), notifying said registered applications that said information from said Global Positioning System device is present.

15. A hand held computer system comprising:

a processor coupled to a bus;

a memory coupled to said bus;

a communication port coupled to said bus;

a location determining device coupled to said communication port;

a plurality of applications;

a communications monitor for automatically turning on said communication port, for receiving information from said communication port, for determining if said information is location information, and for automatically turning off said communication port; and a notification manager for receiving from said communications monitor a signal that said information is said location information and for notifying said plurality of applications that said location information is available.

16. A hand held computer according to claim 15 wherein said location information is provided by a Global Positioning System receiver.

17. A hand held computer according to claim 15, wherein said communication port is substantially compliant with RS-232.

18. A hand held computer according to claim 15, wherein said communication port is substantially compliant with a Secure Digital card interface.

19. A hand held computer according to claim 15, wherein said communication port is an infrared light transceiver.

20. A hand held computer according to claim 15, wherein said communication port is a parallel address and data bus substantially compliant with the signals of said bus.

21. A hand held computer according to claim 15 further comprising an interrupt signal accessible on an external contact.

22. A hand held computer according to claim 15 wherein said location determining device and said communication port are internal to said hand held computer.

23. A hand held computer according to claim 15 wherein said location determining device is a wireless telephony device.

24. A hand held computer according to claim 15 wherein said location determining device accesses transmissions from a Global Positioning System.

25. A hand held computer according to claim 15 wherein said location determining device communicates with said communication port via a wireless communications protocol.

26. A hand held computer according to claim 15 wherein said location information represents the location of a base station in wireless contact with said hand held computer system.

27. A hand held computer according to claim 15 wherein said location information is accessed from said communication port in a format unique to said location determining device, and wherein said format is translated to a universal data format readable by a plurality of applications.

28. A system for receiving information comprising:

communication port electronics for receiving information from a location determining device;

a circuit for automatically activating said communication port electronics in response to the detection of location information and for automatically deactivating said communication port electronics;

a memory for storing said location information received over said communication port;

a plurality of applications resident in said memory and registered with a notification manager program; and wherein said notification manager program, in response to receiving said location information, is for notifying said applications that said location information is stored in said memory.

29. A system as described in claim 28 wherein said communication port electronics is a serial communication device.

30. A system as described in claim 28 further comprising a translator for translating said location information into a universal data format readable by said plurality of applications.

31. A system as described in claim 28 wherein said location determining device comprises Global Positioning System electronics.

* * * * *